United States Patent
Hanks (10) Patent No.: US 12,474,069 B2
(45) Date of Patent: Nov. 18, 2025

(54) SYSTEM FOR EVAPORATIVE COOLING OF AN AIR CONDITIONING CONDENSER OR A RADIATOR TO ENHANCE EFFICIENCIES

(71) Applicant: James Benjamin Hanks, Highland, UT (US)

(72) Inventor: James Benjamin Hanks, Highland, UT (US)

( * ) Notice: Subject to any disclaimer, the term of this patent is extended or adjusted under 35 U.S.C. 154(b) by 0 days.

(21) Appl. No.: 18/601,852

(22) Filed: Mar. 11, 2024

(65) Prior Publication Data

US 2024/0219042 A1   Jul. 4, 2024

Related U.S. Application Data (60) Continuation of application No. 17/505,567, filed on Oct. 19, 2021, now abandoned, which is a division of application No. 15/424,856, filed on Feb. 5, 2017, now abandoned.

(60) Provisional application No. 62/292,067, filed on Feb. 5, 2016.

(51) Int. Cl.
  *F24F 1/42* (2011.01)
  *F24F 13/22* (2006.01)
  *F25B 49/02* (2006.01)

(52) U.S. Cl.
  CPC .............. *F24F 1/42* (2013.01); *F25B 49/027* (2013.01); *F24F 2013/225* (2013.01); *F25B 2339/041* (2013.01)

(58) Field of Classification Search
  CPC ..... F24F 1/42; F24F 2013/225; F25B 49/027; F25B 2339/041
  See application file for complete search history.

(56) References Cited

U.S. PATENT DOCUMENTS

| | | | |
|---|---|---|---|
| 5,701,748 A | 12/1997 | Phelps et al. | |
| 6,823,684 B2 | 11/2004 | Jensen | |
| 7,441,412 B2 | 10/2008 | Jensen | |
| 2003/0221440 A1 | 12/2003 | Limehouse | |
| 2010/0049338 A1* | 2/2010 | Schmitt | F24F 1/42 165/104.19 |
| 2010/0200211 A1 | 8/2010 | Erturk et al. | |
| 2014/0331703 A1* | 11/2014 | LaConte | F24F 1/0003 62/189 |
| 2016/0187066 A1 | 6/2016 | Newman | |

\* cited by examiner

*Primary Examiner* — Elizabeth J Martin
(74) *Attorney, Agent, or Firm* — Kunzler Bean & Adamson (57) ABSTRACT

A system to reduce the temperature of any air conditioning condenser/radiator, either through retrofit or by original manufacturing. The system is connected to a water supply for pre-cooling ambient air drawn into the air conditioning unit by providing a misting spray of water that evaporates rapidly to cool the air conditioning condenser. The system has a water supply connection connected to the water supply, a water treatment assembly for treating aspects of the water supplied, and a water delivery assembly that receives clean water from the water treatment assembly and delivers the misting spray proximate the air conditioning unit. The system may be controlled by using a wireless technology such as a Z-wave or other type of wireless controller and one or more sensors.

19 Claims, 6 Drawing Sheets

SYSTEM FOR EVAPORATIVE COOLING OF AN AIR CONDITIONING CONDENSER OR A RADIATOR TO ENHANCE EFFICIENCIES

CROSS-REFERENCES TO RELATED APPLICATIONS

This is a continuation application of and claims priority to U.S. patent application Ser. No. 17/505,567 entitled "SYSTEM FOR EVAPORATIVE COOLING OF AN AIR CONDITIONING CONDENSER OR A RADIATOR TO ENHANCE EFFICIENCIES" and filed on Oct. 19, 2021 for James Benjamin Hanks, which is a divisional application of and claims priority to U.S. patent application Ser. No. 15/424,856 entitled "SYSTEM FOR EVAPORATIVE COOLING OF AN AIR CONDITIONING CONDENSER OR A RADIATOR TO ENHANCE EFFICIENCIES" and filed on Feb. 5, 2017 for James Benjamin Hanks, each which is incorporated herein by reference. This application also claims the benefit of U.S. Provisional Patent Application Ser. No. 62/292,067 that was filed on Feb. 5, 2016, for an invention titled "SYSTEM FOR EVAPORATIVE COOLING OF AN AIR CONDITIONING CONDENSER OR A RADIATOR TO ENHANCE EFFICIENCIES," which is also incorporated herein by this reference.

FIELD

This invention relates to systems and methods for enhancing air conditioning efficiencies. More specifically, the present disclosure relates to systems and methods that enhance air conditioning efficiencies by providing regulated evaporative cooling of air conditioning condensers/radiators resulting in significant energy efficiencies.

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

BACKGROUND

An air conditioner works by using energy to convert heat into cold air by using a compressor cycle. This cycle allows heat to be transferred from the inside of a house to the outside of the house. A fluid refrigerant is used in this process, whereby heat is absorbed and released as it goes outside. The refrigerant changes in state between gas and liquid during this cycle. Whenever the refrigerant changes from liquid to gas, it absorbs heat; then when it changes back from gas to liquid state, it releases heat. This liquid is passed through an expansion device that changes the liquid into a low-pressure mixture of liquid/gas. This is why some of the air conditioning units have water droplets or "perspiration" on the equipment that is sticking on the outside. The remaining liquid in the indoor coils absorbs heat from the inside air, which turns into a low-temperature gas cooling the indoor air.

The compressor, located outdoors, is the one responsible for compressing the gas. The condenser, also located outdoors like the compressor, is responsible for condensing the vapor. The coils are part of the furnace normally located inside the indoor part of the furnace.

The compressor compresses the low-temperature gas, reducing its volume and increasing its temperature and pressure, which causes it to turn into a vapor. The vapor then goes into the condenser (outdoor coil), which transfers the heat outdoors. This process then causes the refrigerant to condense into a liquid state, which then returns to the expansion device repeating the cycle. As air passes through the indoor coil, the air inside is cooled and dehumidified. During the dehumidification stage, the moisture is removed from the air becoming a liquid form which then gets collected in a pan located at the bottom of the indoor coil of the air conditioner. The liquid or moisture eventually gets drained outside.

Traditional air conditioning condensers/radiators rely on airflow for cooling. Airflow, typically caused by a fan, moves heat away from the condenser replacing the heat with the ambient temperature of the air. If the ambient temperature of the air is high, the airflow is less effective, and the air conditioner must work harder longer to cool the air inside the house.

A number of efforts have been made to cool the condenser or to reduce the ambient temperature of the air. In the manufacture of an air conditioning unit, the surface areas of condenser coils are maximized to expose as much refrigerant within the condenser coils to the heat exchange caused by the airflow. Also, elaborate pre-coolers have been made to cool the air before it encounters the condenser. Further, spray nozzles that emit a mist of water or a mixture of water and a condensate have also been used to cool the ambient air before encountering the condenser. However, several drawbacks have been experienced with spray-nozzle systems. The nozzles frequently clog and they tend to waste precious water.

Efficiently adding water mist to the ambient temperature adds the benefits of evaporative cooling to the known methods used to cool an air conditioning condenser. Reducing the temperature by evaporating a liquid removes latent heat from the surface from which the evaporation takes place.

Accordingly, a need exists for a new system and method for efficiently cooling the airflow through the condenser of air conditioning units and that addresses one or more of these issues. Such systems and methods are disclosed herein.

SUMMARY

The exemplary embodiments of the present disclosure have been developed in response to the present state of the art, and in particular, in response to the problems and needs in the art that have not yet been fully solved by currently available air conditioning units or by efforts to pre-cool the ambient air.

The exemplary embodiments of the present disclosure were created and assembled to reduce the temperature of any air conditioning condenser/radiator, either through retrofit or by original manufacturing. In one embodiment, the system activates based on the fan operation and takes pressurized water and sends it through a process, which removes certain impurities, regulates the flow of the water, provides a pathway from the water source to the air conditioner/radiator, and reduces the flow to make the water evaporate quickly.

In another embodiment, the system activates based on the command of a temperature sensor on the AC condenser which takes pressurized water and sends it through a process, which removes certain impurities, regulates the flow of the water, provides a pathway from the water source to the air conditioner/radiator, and reduces the flow to make the water evaporate quickly.

The water source may be directly connected to a pressurized water line, or it may be converted using a specialized hose bib, which allows the house owner to use a hose in a traditional manner while providing a second water exit orifice so that a pressurized stream of water feeds an electronic valve. After reaching and passing through the valve, the water is processed to remove impurities such as minerals and solids that may build up to reduce the function of the system.

The pressurized water enters the electronic valve, which regulates the flow of water based on the operation of the air conditioning condenser fan, or as in another embodiment, based on the command of one or more temperature sensors. The valve releases the pressurized water into a series of hoses that are affixed around the condenser of the air conditioning system. Each of these hoses has an end coupled to a misting tip or nozzle. These misting tips or nozzles reduce the stream of water emitted to moisten the condenser/radiator with the precise amount of water to cause evaporative temperature reduction and inhibit the waste of water.

By adjusting the misting nozzles and the water flow within the system properly, the mist pre-cools the air and is drawn through the fins of the condenser. This adjustment may be unique to each installation or retrofit because water pressure, water temperature, filtering resistance, humidity, ambient temperature, in-house temperature setting, and other factors may differ from installation to installation and may differ from hour to hour. Hence, it is particularly advantageous to have adjustments made via sensors and a controller that assesses the sensor readings and adjusts settings within the system accordingly.

The systems and methods of the present disclosure comprise a concise collection of components which convert traditional water sources, like garden hose connections, into an evaporative cooling system that rapidly reduces the temperature of an air conditioning condenser/radiator. This temperature reduction process greatly reduces electricity, or any other form of energy required to operate an air conditioning system. Reduced energy required to operate an air conditioner provides the ultimate benefit of less energy needing to be produced, and additionally provides a financial benefit to those who pay for the energy used to operate an air conditioner.

In some exemplary embodiments, the systems and methods may further comprise a water pump that enhances the pressure needed to filter the water properly while assuring that there is pressure to create the desired mist being emitted from the misting nozzles.

The systems and methods of the present disclosure apply evaporative pre-cooling to the exterior surface of an air conditioning condenser. The systems have components that regulate, and conserve water use and treat the water to optimize efficiency.

The exemplary systems have one or more temperature driven sensors. Each such sensor offers the ability to measure and subsequently control the evaporative pre-cooling process. By strategic placement of sensors, key temperature measurements may be taken including, but not limited to the following: the ambient air temperature of the air flowing through the unit, the ambient air temperature of the surrounding environment proximate and/or less proximate the unit, the water temperature throughout the system, the condenser coil temperature, and the line temperature on the air conditioning system, as well as the HVAC thermostat output in the house.

Such one or more sensors may be controlled by wireless communications devices for climate control, including but not limited to a Z-wave controller that receives the temperature readings from the one or more sensors, and actuates the system by controlling valves and water flow so that optimum cooling can be achieved with a minimum use of energy, all while inhibiting or eliminating water waste.

The exemplary systems have water treatment features, applied in the initial-flow stages, which provide many benefits to the balance of the process. A filtration process makes each down-line component cleaner, more efficient and extends the functional life of the individual components, the air conditioning condenser and the pre-cooling system of the present disclosure.

These and other features of the present invention will become more fully apparent from the following description or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

The exemplary embodiments of the present disclosure will be best understood by reference to the figures, wherein like parts are designated by like numerals throughout. It should be readily understood that the components of the exemplary embodiments, as generally described and illustrated in the figures herein, may be arranged and designed in a wide variety of different configurations. Thus, the following description of the exemplary embodiments, as represented in the figures, is not intended to limit the scope of the present disclosure, but is merely representative of exemplary embodiments.

In this application, the phrases "connected to", "coupled to", and "in communication with" refer to any form of interaction between two or more entities, including mechanical, capillary, electrical, magnetic, electromagnetic, pneumatic, hydraulic, fluidic, and thermal interactions.

The phrases "attached to", "secured to", and "mounted to" refer to a form of mechanical coupling that restricts relative translation or rotation between the attached, secured, or mounted objects, respectively. The phrase "slidably attached to" refer to a form of mechanical coupling that permits relative translation, respectively, while restricting other relative motions. The phrase "attached directly to" refers to a form of securement in which the secured items are in direct contact and retained in that state of securement.

The term "abutting" refers to items that are in direct physical contact with each other, although the items may not be attached together. The term "grip" refers to items that are in direct physical contact with one of the items firmly holding the other. The term "integrally formed" refers to a body that is manufactured as a single piece, without requiring the assembly of constituent elements. Multiple elements may be integrally formed with each other, when attached directly to each other from a single work piece. Thus, elements that are "coupled to" each other may be formed together as a single piece.

Figure 1:
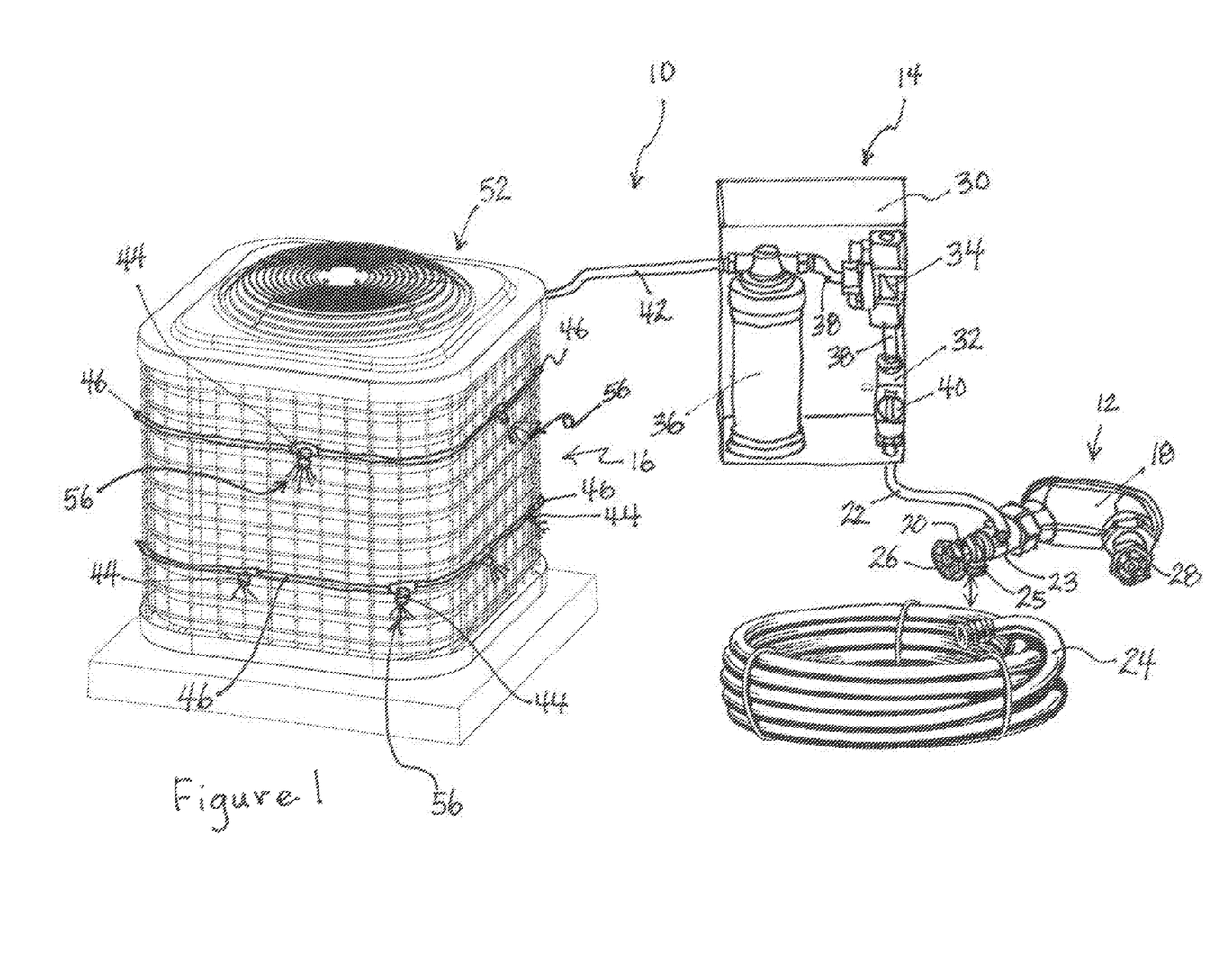
FIG. 1 is a perspective view of a basic, exemplary, retrofit pre-cooling system as might be encountered at many existing houses with air conditioning units.
Figure 2:
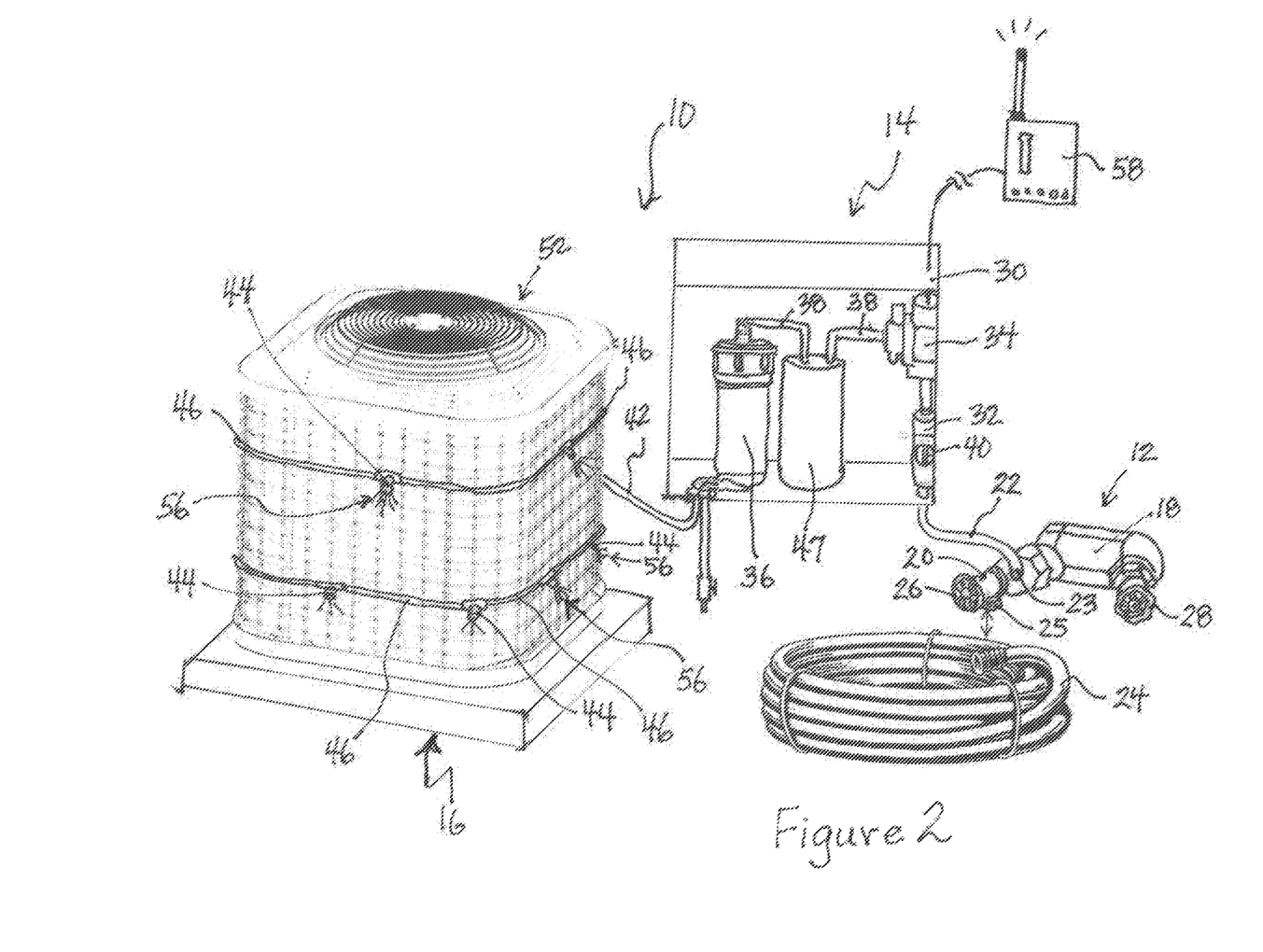
FIG. 2 is a perspective view of an alternative, exemplary, retrofit pre-cooling system wherein a water pump is an added component.
Figure 3:
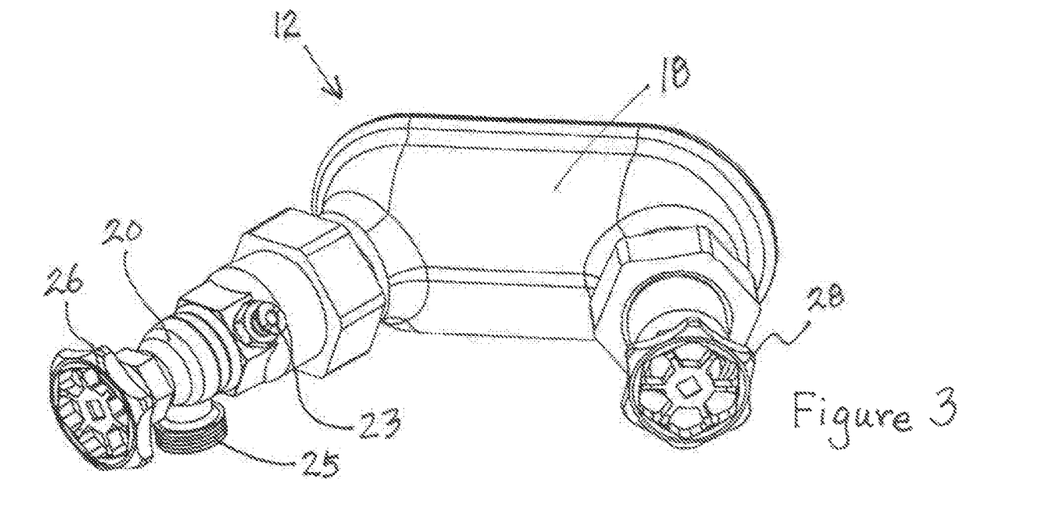
FIG. 3 is a perspective view of an exemplary water supply connection for either of the exemplary systems of FIGS. 1 and 2.

Referring now to FIGS. 1-3, FIG. 1 is a perspective view of a basic, exemplary, retrofit pre-cooling system. The pre-cooling system, generally designated 10, comprises a water supply connection 12, a water treatment assembly 14, and a water delivery assembly 16. The water supply connection 12, in FIG. 1, is an example of a retrofit applied to an existing hose bib 18, and comprises a water cooler hose bib 20 (the water cooler hose bib 20 is an off the shelf item that can be found at plumbing supply stores by that name) connected to the male threads (not shown) of the existing hose bib 18, and a feed line 22 coupled to the water cooler hose bib 20 at a cooler outlet 23 for conveying pressurized water (not shown) from the existing hose bib 18, through the water cooler hose bib 20, through the feed line 22, to the water treatment assembly 14.

In this manner, a garden hose 24 may be connected to the male threads 25 of the water cooler hose bib 20 and water may be delivered to the garden hose 24 by turning a handle grip 26 of the water cooler hose bib 20 to open the valve (internal to the water cooler hose bib 20). Also, the flow of water through the water supply connection 12 water may be turned on or off by turning the handle 28 of the existing hose bib 18.

Of course, those skilled in the art will understand that a feed line 22 may be directly connected to a source of pressurized water such as an existing cold-water pipe or water line, or some other configuration of adaptors may be connected to an existing hose bib 18 to supply the pressurized water for pre-cooling systems 10 of the present disclosure.

Figure 4:
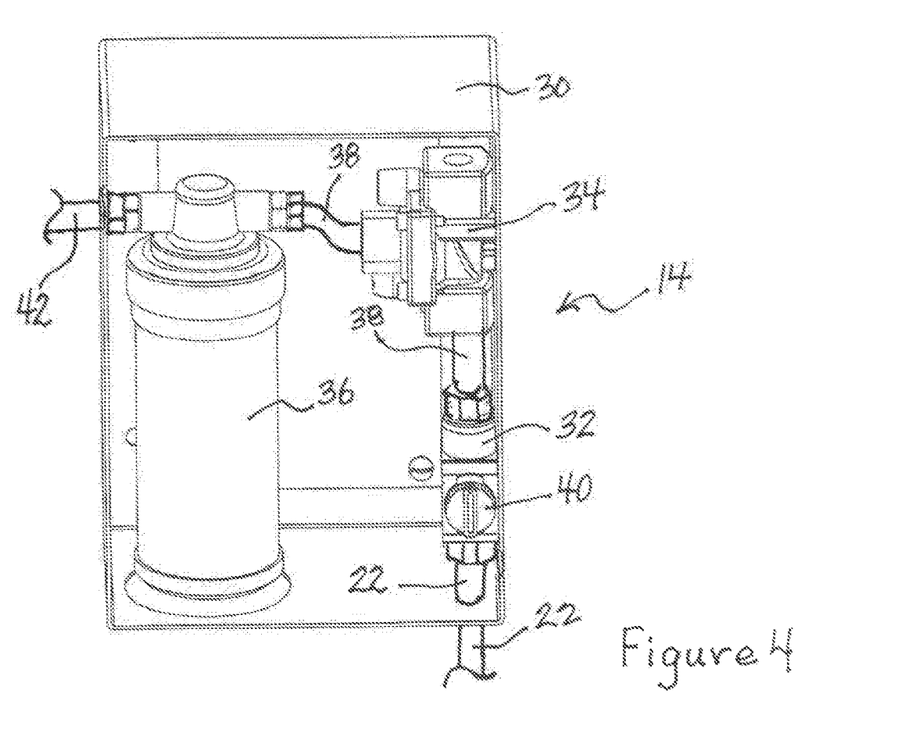
FIG. 4 is a perspective view of an open utility box as depicted in FIG. 1 showing the flow reducer, the solenoid valve, and the water filter housed inside.

An exemplary water treatment assembly 14 is housed in a utility box 30, best shown in FIG. 4. The water treatment assembly 14 shown in FIGS. 1, 2, and 4 demonstrates three aspects in which the flow of water from the existing hose bib 18 may be modified. When the existing hose bib 18 is turned on, pressurized water is delivered through the feed line 22, even if the water cooler hose bib 20 is turned off and water is not flowing through the garden hose 24. As depicted in the FIGS. 1, 2 and 4, the exemplary water treatment assembly 14 comprises a flow reducer 32, a solenoid valve 34, and a water filter 36 connected by water lines 38 through which water may flow.

The feed line 22 is connected to the flow reducer 32. The flow reducer 32 has adjustability to reduce the flow of water through the remainder of the system 10. As best shown in FIG. 4, the flow reducer 32 has a manually-operable adjustment screw 40. To achieve optimum flow, the adjustment screw 40 may be set to provide the proper amount of mist without wasting water. It is not unusual for a water supply to operate at pressures up to as much as 100 psi. Consequently, the flow reducer 32 serves to reduce the flow and the pressure into a more optimum range for the pre-cooling system 10. Depending on the water filter 36 being used, usually a minimum of about 40 psi is required to pass water through the water filter 36. Also, depending on what type of misting nozzles 44 are used, usually a minimum of about 40 psi is required for the misting nozzles 44 to create a misting spray 56, though in some exemplary embodiments a pressure of about 80 psi is optimum. With the proper amount of mist, the entire mist is drawn into the air conditioning unit for rapid evaporation without appreciable water droplets falling to the ground at the base of the unit. Although, the flow reducer 32 shown is manually adjusted, it should be understood that the flow reducer 32 could have controlled adjustment, such as by wireless technology for climate control, including but not limited to Z-wave technology, by positioning one or more sensors 60 (see FIG. 7) at or near the base of the unit beneath the misting spray 56 to detect an undesirable amount of water droplets.

A water line 38 connects the flow reducer 32 to the solenoid valve 34. The solenoid valve 34 communicates with a sensor 60 within the house (not shown, but understood by those skilled in the art), such as a thermostat, to detect when to turn on or off the flow of water through the system 10. The solenoid valve 34 shown in FIG. 4 is connected to the electrical system of the house; however, it should be understood that the solenoid valve 34 may be battery operated and/or may be controlled by wireless technology such as Z-wave technology (see Z-wave controller 58, FIG. 6).

Another water line 38 connects the solenoid valve 34 to the water filter 36. The water filter 36 processes the water to remove impurities such as minerals and other solids that may clog the system 10 or build up on surfaces within the system 10, in much the same manner as water passing through a refrigerator filter removes impurities. Although many types of water filters 36 will work suitably, an exemplary embodiment of the system 10 uses a Reverse Osmosis Membrane water filter 36 that requires at least 40 psi to operate properly. Because the flow reducer 32 reduces the water flow and the solenoid valve 34 only allows water through the system 10 when needed, the water filter 36 processes only the water needed to provide optimum air conditioning. Hence, the life of the water filter 36 is maximized.

The water exiting the water filter 36 is clean and flows into another water line 38, exit line 42, feeding the water delivery assembly 16 at an optimum flow rate. The water delivery assembly comprises an array of misting nozzles 44 connected to delivery lines 46 fed by exit line 42. The misting nozzles 44 are positioned to provide optimum pre-cooling of the ambient air as it is drawn into the air conditioning unit to cool the condenser 52. As mentioned above, with optimum flow of the water through the system 10 as regulated by the flow reducer 32 and timely on/off regulation by the solenoid valve 34, the misting spray 56 emitted from the misting nozzles 44 without any appreciable waste of water because the misting spray 56 is drawn into the unit for rapid evaporation that cools the condenser 52.

Similar to the pre-cooling system of FIG. 1, an alternative, exemplary retrofit pre-cooling system 10 is depicted in FIG. 2. This alternative, exemplary retrofit pre-cooling system 10 comprises the water supply connection 12, the water treatment assembly 14, and the water delivery assembly 16. However, the water treatment assembly 14 also has a water pump 47. The water supply connection 12, in FIG. 2, is again an example of a retrofit applied to an existing hose bib 18, and comprises the water cooler hose bib 20 connected to the male threads (not shown) of the existing hose bib 18, and the feed line 22 coupled to the water cooler hose bib 20 at the cooler outlet 23 for conveying pressurized water (not shown) from the existing hose bib 18, through the water cooler hose bib 20, through the feed line 22, to the water treatment assembly 14.

Again, a garden hose 24 may be connected to the male threads 25 of the water cooler hose bib 20 and water may be delivered to the garden hose 24 by turning a handle grip 26 of the water cooler hose bib 20 to open the valve (internal to the water cooler hose bib 20). Also, the water flow through the water supply connection 12 may be turned on or off by turning the handle 28 of the existing hose bib 18.

Of course, those skilled in the art will understand that a feed line 22 may be directly connected to a source of pressurized water such as an existing cold-water pipe or water line, or some other configuration of adaptors may be connected to an existing hose bib 18 to supply the pressurized water for pre-cooling systems 10 of the present disclosure. Additionally, although the system 10 is described as a retrofit, those skilled in the art will understand that the system may be installed together with an air conditioning unit when the unit is installed or certain components of the system 10 may be incorporated into a standard air conditioning unit as a manufacturer's upgrade.

The exemplary water treatment assembly 14 is housed in an enlarged utility box 30 or an enclosure that houses the utility box 30 as well as the water pump 47 and water filter 36. The water treatment assembly 14 shown in FIG. 2 demonstrates three aspects in which the flow of water from the existing hose bib 18 may be modified. When the existing hose bib 18 is turned on, pressurized water is delivered through the feed line 22, even if the water cooler hose bib 20 is turned off and water is not flowing through the garden hose 24. As depicted in the FIG. 2, the exemplary water treatment assembly 14 comprises a flow reducer 32, a solenoid valve 34, a water pump 47, and a water filter 36 connected by water lines 38 through which water may flow.

The feed line 22 is connected to the flow reducer 32. The flow reducer 32 has adjustability to reduce the flow of water through the remainder of the system 10. As best shown in FIG. 4, the flow reducer 32 has a manually-operable adjustment screw 40. To achieve optimum flow, the adjustment screw 40 may be set to provide the proper amount of mist 56 without wasting water. With the proper amount of mist 56, the entire mist 56 is drawn into the air conditioning unit for rapid evaporation without appreciable water droplets falling to the ground at the base of the unit. Although, the flow reducer 32 shown is manually adjusted, it should be understood that the flow reducer 32 could have controlled adjustment, such as by wireless technology for climate control, including but not limited to Z-wave technology, by positioning one or more sensors 60 (see FIG. 7) at or near the base of the unit beneath the misting spray 56 to detect an undesirable amount of water droplets.

Additionally, when a water pump 47 is included, the need for a flow reducer 32 may be obviated because the flow characteristics of the water flow may be managed by regulating the pressure and flow exiting the water pump 47.

A water line 38 connects the flow reducer 32 to the solenoid valve 34. The solenoid valve 34 communicates with a sensor 60 within the house (not shown, but understood by those skilled in the art), such as a thermostat, to detect when to turn on or off the flow of water through the system 10. The solenoid valve 34 shown in FIG. 4 is connected to the electrical system of the house; however, it should be understood that the solenoid valve 34 may be battery operated and/or may be controlled by wireless technology such as Z-wave technology and the like.

Water lines 38 connect the solenoid valve 34 to the water pump 47 and the water pump 47 to the water filter 36. The water filter 36 processes the water to remove impurities such as minerals and other solids that may clog or damage the system 10 or build up on surfaces within the system 10, in much the same manner as water passing through a refrigerator filter removes impurities. Because the flow reducer 32 reduces the water flow and the solenoid valve 34 only allows water through the system 10 when needed and the water pump 47 pumps the water at optimum pressure and flow to optimize filtration and pressure for misting, the water filter 36 processes only the water needed to provide optimum air conditioning. Hence, the lives of the water filter 36 and the water pump 47 are maximized.

The water exiting the water filter 36 is clean and flows into another water line 38, exit line 42, feeding the water delivery assembly 16 at an optimum flow rate. The water delivery assembly comprises an array of misting nozzles 44 connected to delivery lines 46 fed by exit line.

The misting nozzles 44 are positioned to provide optimum pre-cooling of the ambient air as it is drawn into the air conditioning unit to cool the condenser 52. As mentioned above, with optimum flow of the water through the system 10 as regulated by the flow reducer 32 and timely on/off regulation by the solenoid valve 34 and management of flow and pressure by the water pump 47, the misting spray 56 emitted from the misting nozzles 44 mists 56 without any appreciable waste of water because the misting spray 56 is drawn into the unit for rapid evaporation that cools the condenser 52.

Figure 5:
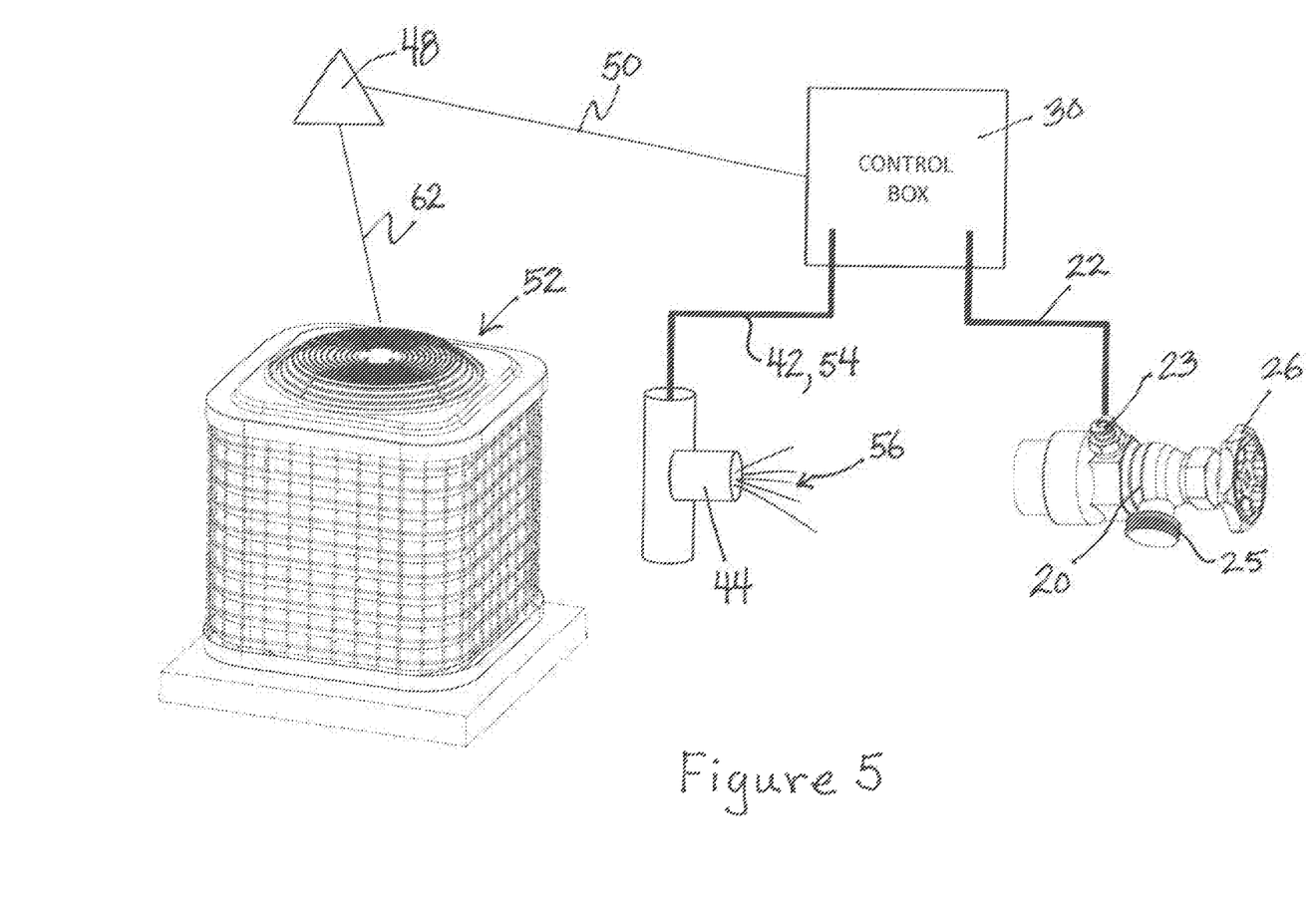
FIG. 5 is a schematic view of another exemplary embodiment of a pre-cooling.

Referring now to FIG. 5, a schematic view of another exemplary embodiment of a pre-cooling system 10. Depicted are a hose bib (water cooler hose bib 20), a control box (utility box 30), a controller (whether wireless or not) in the form of a 24-volt switch 48 that communicates a 24-volt signal 50 to the control box (utility box 30) and receives communication via communication line 62 from the air conditioning condenser 52, and a W' supply hose 54 that supplies water to misting nozzles 44. With this exemplary embodiment of the system 10, when the air conditioning condenser 52 turns on (usually determined by a thermostat in the house), the fan in the air conditioning unit will turn on and a signal is sent to the 24-volt switch 48 that in turn signals the solenoid valve 34 (not shown) within the control box 30 to open the flow of water. Water passes through the W' supply hose 54 or line to the misting nozzles 44 to provide a misting spray 56 that pre-cools the ambient air and the condenser 52.

In this embodiment, no water filter 36 is shown, but it should be understood that it may be inserted in-line any-where between the hose bib 20 and the misting nozzles 44, or in areas where minerals or other impurities are not a problem or where the entire water system for the house is filtered (i.e., filtered water is supplied to the hose bib 20) a water filter 36 may be unnecessary.

Figure 6:
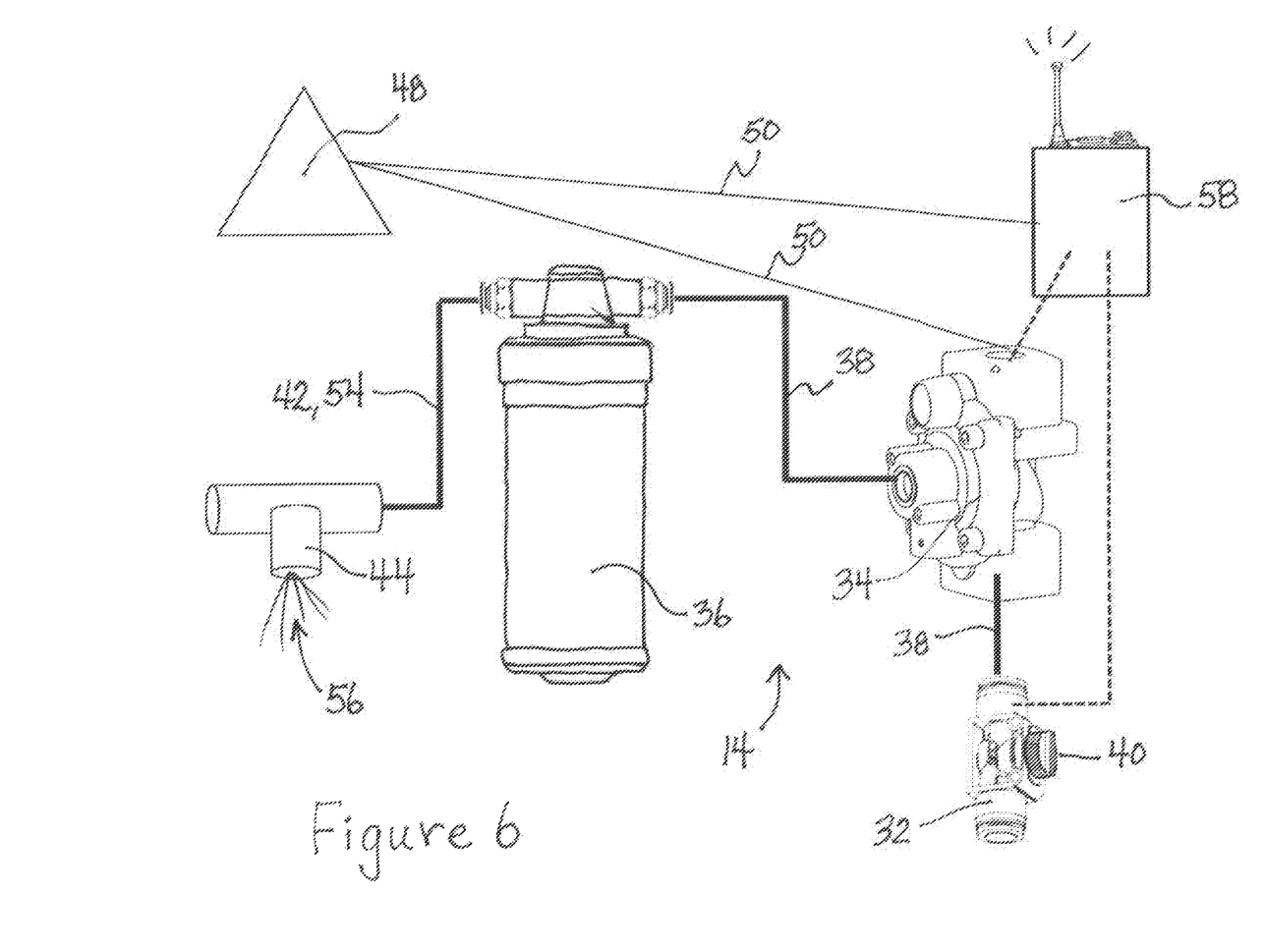
FIG. 6 is a schematic view of yet another exemplary embodiment of a pre-cooling system using a Z-wave controller.

FIG. 6 is a schematic view of yet another exemplary embodiment of a pre-cooling system 10 using a Z-wave controller 58. Depicted are a sure reducer (flow reducer 32), a 24-volt solenoid valve 34, a 24-volt signal 50 from a 24-volt switch 48, a Z-wave controller 58, a water filter 36, and misting nozzles 44. With this embodiment, the Z-wave controller 58 may control the operation of the entire system 10 based on pre-programmed instructions within the Z-wave controller 58. For example, the exemplary system 10 may have one or more temperature driven sensors 60 and moisture sensing sensors 60. Each such sensor 60 offers the ability to measure and subsequently control the evaporative pre-cooling process. By strategic placement of sensors 60, key temperature measurements may be taken including, but not limited to the following: the ambient air temperature of the air flowing through the unit, the ambient air temperature of the surrounding environment proximate and/or less proximate the unit, the water temperature throughout the system, the condenser 52 coil temperature, and the line temperature on the air conditioning system, as well as the HVAC thermostat output in the house. Moisture sensors 60 may also detect wastewater droplets and signal the reduction of water flow.

Such one or more sensors 60 may be controlled by the Z-wave controller 58 that receives the temperature readings from the one or more sensors 60, processes those temperature readings, and sends an instruction that actuates the system 10 by controlling valves such as the solenoid valve 34 and water flow such as by adjusting the flow at the flow reducer 32 so that optimum cooling may be achieved with a minimum use of energy, all while inhibiting or eliminating water waste.

By using a Z-wave controller 58, a retrofit of the system 10 on an existing air conditioning unit can be customized to the house for optimum efficiency and minimum use of water and electricity. Also, if the house is enlarged or reduced by remodeling, the programming of the Z-wave controller 58 may be altered to once again achieve optimum efficiency and minimum use of water and electricity. Of course, the system 10 can also be installed at the time of the house construction so that adaptation for retrofit may be avoided.

Figure 7:
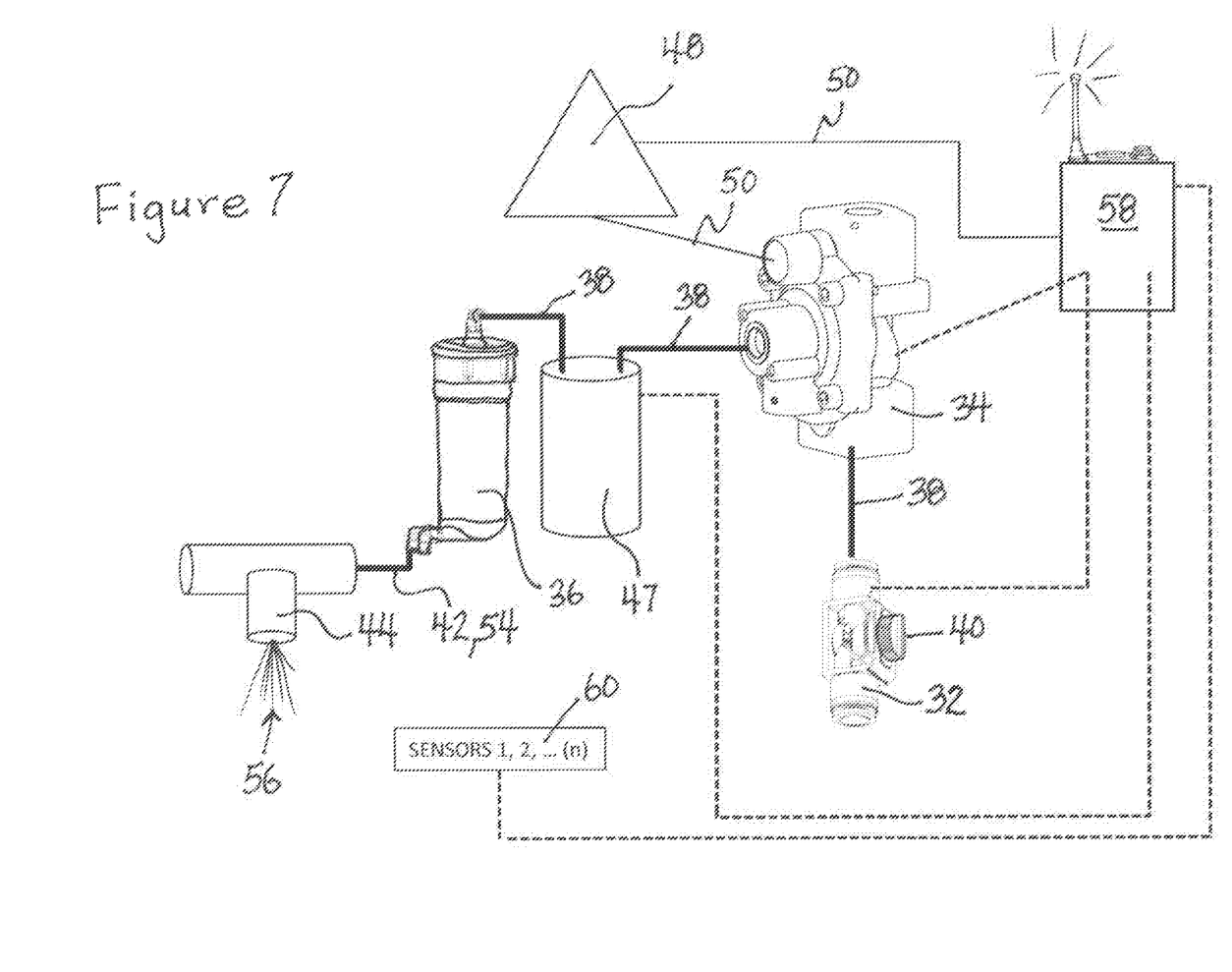
FIG. 7 is a schematic view of still another exemplary embodiment of a pre-cooling system using both a Z-wave controller with sensors and a water pump.

FIG. 7 is a schematic view of still another exemplary embodiment of a pre-cooling system 10 using a Z-wave controller 58. Depicted are the flow reducer 32, the Z-wave controller 58, the water pump 47, the water filter 36, and misting nozzles 44. With this embodiment, the Z-wave controller 58 may control the operation of the entire system 10 based on pre-programmed instructions within the Z-wave controller 58. Again, the exemplary system 10 may have one or more temperature driven sensors 60 and moisture sensing sensors 60. Each such sensor 60 offers the ability to measure variable aspects of the system 10 and its operating environment and subsequently control the evaporative pre-cooling process. By strategic placement of sensors 60, key temperature measurements may be taken including, but not limited to the following: the ambient air temperature of the air flowing through the unit, the ambient air temperature of the surrounding environment proximate and/or less proximate the unit, the water temperature throughout the system, the condenser 52 coil temperature, and the line temperature on the air conditioning system, as well as the HVAC thermostat output in the house. Moisture sensors 60 may also detect humidity and/or wastewater droplets and signal the reduction of water flow.

Such one or more sensors 60 may be controlled by the Z-wave controller 58 that receives the temperature and/or moisture readings from the one or more sensors 60, processes those temperature/moisture readings, and sends at least one instruction that actuates the system 10 by controlling valves such as the solenoid valve 34 and water flow such as by adjusting the flow at the flow reducer 32 and/or the water pump 47 so that optimum cooling can be achieved with optimum filtration and a minimum use of energy, all while inhibiting or eliminating water waste.

By using a Z-wave controller 58, a retrofit of the system 10 on an existing air conditioning unit can be customized to the house for optimum efficiency and minimum use of water and electricity. Also, if the house is enlarged or reduced by remodeling, the programming of the Z-wave controller 58 may be altered to once again achieve optimum efficiency and minimum use of water and electricity. Of course, the system 10 can also be installed at the time of the house construction so that adaptation for retrofit may be avoided.

Those skilled in the art will appreciate that the exemplary embodiments disclosed are merely exemplary. The system 10 may be easily adapted for small to larger business buildings or any other building requiring air conditioning.

The disclosure anticipated that the system and methods of this disclosure may be embodied in other specific forms without departing from its structures, methods, or other essential characteristics as broadly described herein and claimed hereinafter. The described embodiments are to be considered in all respects only as illustrative, and not restrictive. The scope of the disclosure is, therefore, indicated by the appended claims, rather than by the foregoing description. All changes that come within the meaning and range of equivalency of the claims are to be embraced within their scope.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under Section 112, 6th paragraph is not intended. Additionally, it is not intended that the scope of patent protection afforded the present invention be defined by reading into any claim a limitation found herein that does not explicitly appear in the claim itself.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

Those skilled in the art will appreciate that the present embodiments may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A system connected to a water supply for pre-cooling ambient air drawn into an air conditioning unit having a condenser by providing a misting spray of water that evaporates rapidly to cool the air conditioning condenser, the system comprising:
    a water supply connection connected to the water supply, the water supply connection directs water from the water supply into the system;
    a water treatment assembly for treating aspects of the water supplied through the water supply connection having a controllable flow reducer that regulates a water flow through the system to create a water pressure at a plurality of misting nozzles;
    a water delivery assembly that receives water from the water treatment assembly and delivers the misting spray indirectly to the air conditioning unit by delivering the misting spray outward proximate the air conditioning unit to be drawn in by the air conditioning unit, wherein the water delivery assembly comprises the plurality of misting nozzles positioned on an exterior surface of the condenser, and wherein the plurality of misting nozzles is oriented to direct the misting spray away from the condenser; and
    a controller that manages a passage of water from the water supply to the misting spray, wherein the controller regulates the passage of water to the plurality of misting nozzles in response to detecting operation of a fan of the condenser, and wherein the controller controls the flow reducer to adjust the water pressure in response to a sensor detecting an amount of water droplets that exceeds a threshold.

2. The system of claim 1 wherein the water supply comprises an existing hose bib and the system is connected to the existing hose bib by retrofit.

3. The system of claim 1 wherein the water supply connection connected to the water supply comprises a water cooler hose bib and a feed line connected to the water cooler hose bib.

4. The system of claim 1 wherein the water treatment assembly comprises a solenoid valve that turns the water flow on and off.

5. The system of claim 1 wherein the water delivery assembly comprises an exit line connected to the water treatment assembly, a plurality of delivery lines connected to the exit line each delivery line having a receiving end, an exit end, and wherein one of the plurality of misting nozzles is coupled to the exit end of one of the plurality of delivery lines.

6. The system of claim 4 wherein the water treatment assembly further comprises a water filter for removing impurities from the water before entering the water delivery assembly.

7. The system of claim 6 wherein the water treatment assembly further comprises a water pump, the water pump enhances a pressure needed to treat the water flowing through the water filter and regulates the water flow filtered to assure pressure sufficient to create the misting spray.

8. The system of claim 7 wherein the system further comprises at least one sensor and a wireless communications device that communicates with the at least one sensor, the wireless communications device controls at least one of the flow reducer, the solenoid valve, and the water pump based on communication received from the at least one sensor.

9. The system of claim 8 wherein the wireless communications device comprises a Z-wave controller.

10. A system connected to a water supply for pre-cooling ambient air drawn into an air conditioning unit having a condenser by providing a misting spray of water that evaporates rapidly to cool the air conditioning condenser, the system comprising:
    a water supply connection connected to the water supply, the water supply connection directs water from the water supply into the system;
    a water treatment assembly for treating aspects of the water supplied through the water supply connection having a controllable flow reducer that regulates a water flow through the system to create a water pressure at a plurality of misting nozzles;
    a water delivery assembly that receives water from the water treatment assembly and delivers the misting spray indirectly to the air conditioning unit by delivering the misting spray outward proximate the air conditioning unit to be drawn in by the air conditioning unit, wherein the water delivery assembly comprises the plurality of misting nozzles positioned on an exterior surface of the condenser, and wherein the plurality of misting nozzles is oriented to direct the misting spray away from the condenser; and
    a wireless controller that manages a passage of water from the water supply to the misting spray, wherein the wireless controller regulates the passage of water to the plurality of misting nozzles in response to detecting operation of a fan of the condenser, and wherein the wireless controller controls the flow reducer to adjust the water pressure in response to a sensor detecting an amount of water droplets that exceeds a threshold.

11. The system of claim 10 wherein the water treatment assembly comprises a solenoid valve that turns the water flow on and off.

12. The system of claim 11 wherein the water treatment assembly further comprises a water filter for removing impurities from the water before entering the water delivery assembly.

13. The system of claim 12 wherein the water treatment assembly further comprises a water pump, the water pump enhances a pressure needed to treat the water flowing through the water filter and regulates the water flow filtered to assure pressure sufficient to create the misting spray.

14. The system of claim 13 wherein the system further comprises at least one sensor and the wireless controller communicates with the at least one sensor, the wireless controller controls at least one of the flow reducer, the solenoid valve, and the water pump based on communication received from the at least one sensor.

15. The system of claim 14 wherein the wireless controller comprises a Z-wave controller.

16. A method for pre-cooling ambient air drawn into an air conditioning unit having a condenser, the method comprising the steps of:

connecting the air conditioning unit to a water supply, a water treatment assembly, and a water delivery assembly such that water supplied by the water supply passes through the water treatment assembly and exits from the water delivery assembly as a misting spray proximate to the condenser, wherein the water treatment assembly comprises a controllable flow reducer that regulates a water pressure at a plurality of misting nozzles, wherein the water delivery assembly comprises the plurality of misting nozzles positioned on an exterior surface of the condenser, and wherein the plurality of misting nozzles are oriented to direct the misting spray away from the condenser;

controlling the misting spray by managing a passage of water from the water supply to the misting spray; and managing water flow to provide a misting spray that limits water droplets wasted by indirectly delivering the misting spray to the air conditioning unit by directing the misting spray outward proximate the air conditioning unit to be drawn in by the air conditioning unit, and regulating the water flow to the plurality of misting nozzles in response to detecting operation of a fan of the condenser, and controlling the flow reducer to adjust the water pressure at the plurality of misting nozzles in response to a sensor detecting an amount of water droplets that exceeds a threshold.

17. The method of claim 16 further comprising the step of filtering the water to inhibit impurities from modifying the misting spray.

18. The method of claim 16 further comprising the step of pumping water through a water filter to remove impurities and to maintain pressure and water flow through a plurality of misting nozzles to create the misting spray.

19. The method of claim 16 wherein the step of controlling the misting spray comprises the steps of:

sensing temperature at least at one location;

generating a temperature reading signal and transmitting that temperature reading signal to a wireless controller; and processing the temperature and sending an instruction that directs the water treatment assembly to modify at least one of a water pressure and water flow rate between the water supply and the misting spray.

* * * * *